(12) United States Patent
Chen et al.

(10) Patent No.: US 11,314,880 B2
(45) Date of Patent: Apr. 26, 2022

(54) DECOUPLING CONTAINER IMAGE LAYERS TO PRESERVE PRIVACY

(71) Applicant: Red Hat, Inc., Raleigh, NC (US)

(72) Inventors: Huamin Chen, Westborough, MA (US); Jay Vyas, Concord, MA (US)

(73) Assignee: RED HAT, INC., Raleigh, NC (US)

( * ) Notice: Subject to any disclaimer, the term of this patent is extended or adjusted under 35 U.S.C. 154(b) by 299 days.

(21) Appl. No.: 15/339,334

(22) Filed: Oct. 31, 2016

(65) Prior Publication Data

US 2018/0124055 A1 May 3, 2018

(51) Int. Cl.
*G06F 21/62* (2013.01)
*H04L 29/06* (2006.01)

(52) U.S. Cl.
CPC ...... *G06F 21/6218* (2013.01); *G06F 21/6209* (2013.01); *H04L 63/0407* (2013.01)

(58) Field of Classification Search
CPC . H04L 63/04; H04L 63/0407; H04L 63/0414; H04L 63/0421; H04L 63/08; H04L 63/083; G06F 21/60; G06F 21/62; G06F 21/6209; G06F 21/6218; G06F 21/6227; G06F 21/6245; G06F 21/6254; G06F 21/6263
See application file for complete search history.

(56) References Cited

U.S. PATENT DOCUMENTS

| | | | | |
|---|---|---|---|---|
| 2004/0162787 A1* | 8/2004 | Madison | ............ | G06F 21/10 705/64 |
| 2013/0226975 A1* | 8/2013 | Lee | ............ | G06F 17/3007 707/821 |
| 2016/0127447 A1* | 5/2016 | Jiang | ............ | H04L 67/06 709/203 |
| 2016/0139737 A1* | 5/2016 | Conn | ............ | G06F 3/0482 715/802 |
| 2016/0173406 A1* | 6/2016 | Geller | ............ | G06F 9/468 709/225 |
| 2017/0104599 A1* | 4/2017 | Ali | ............ | G06F 21/10 |
| 2017/0315795 A1* | 11/2017 | Keller | ............ | G06F 11/3409 |
| 2017/0329588 A1* | 11/2017 | Lundberg | ............ | G06F 8/60 |

OTHER PUBLICATIONS

Docker, Docker Registry HTTP API V2 (116 pages).
Docker, Understand images, containers, and storage drivers (19 pages).
Saltstack, Salt.modules.dockerng, 2016 (49 pages).
Docker, Pull (12 pages).

* cited by examiner

*Primary Examiner* — Theodore C Parsons
(74) *Attorney, Agent, or Firm* — K&L Gates LLP

(57) ABSTRACT

An example system includes a memory, one or more processors in communication with the memory, and a container image generator. The container image generator receives a first set of information. The container image generator receives a second set of information, including secure information that requires validation to be accessed. The container image generator generates a first container layer, including a first URL associated with the first set of information. The container image generator generates a second container layer, including a second URL associated with the second set of information. The container image generator stores the first container layer and the second container layer at a storage location.

18 Claims, 6 Drawing Sheets

DECOUPLING CONTAINER IMAGE LAYERS TO PRESERVE PRIVACY

BACKGROUND

In computer systems, containers are typically used for creating hosting environments for running applications, programs, etc. A computer system may use a container based virtualization system, and the containers may include all of the necessary components to generate an isolated runtime environment for specific applications, including operating systems, middleware, applications, databases, and other components. To create fully functional environments without unnecessary overhead, container images are typically constructed from individual layers, each of which includes a component, for example, for the operation of applications intended to run in the container. These individual layers combine together to form a container image for the desired purpose.

For example, a layer may be as large as a full operating system or as small as an individual configuration file. Typically, container images are structured as a series of layers built on top of preceding layers. Thus, it is not uncommon to implement dozens of layers in a full container image. Each layer may provide a specific functionality necessary for the successful operation of the container. Likewise, each layer may respectively represent a component or subcomponent of a container, such as a base operating system, middleware, an application, a data set, etc. In many settings, a container image may utilize dozens of layers to operate in a given environment. In different implementations, for example, the container image may include layers associated with different databases, different operating systems, etc.

SUMMARY

The present disclosure provides new and innovative methods and systems for decoupling container image layers to preserve privacy. For example, the method includes receiving, by a container image generator, a first set of information. Likewise, the container image generator receives a second set of information. The second set of information includes secure information that requires validation to be accessed. The method includes generating, by the container image generator, a first container layer. The first container layer includes a first URL associated with the first set of information. The method includes generating, by the container image generator, a second container layer. The second container layer includes a second URL associated with the second set of information. The method includes storing the first container layer and the second container layer at a storage location.

Additional features and advantages of the disclosed methods and systems are described in, and will be apparent from, the following Detailed Description and the Figures.

DETAILED DESCRIPTION OF EXAMPLE EMBODIMENTS

Figure 1:
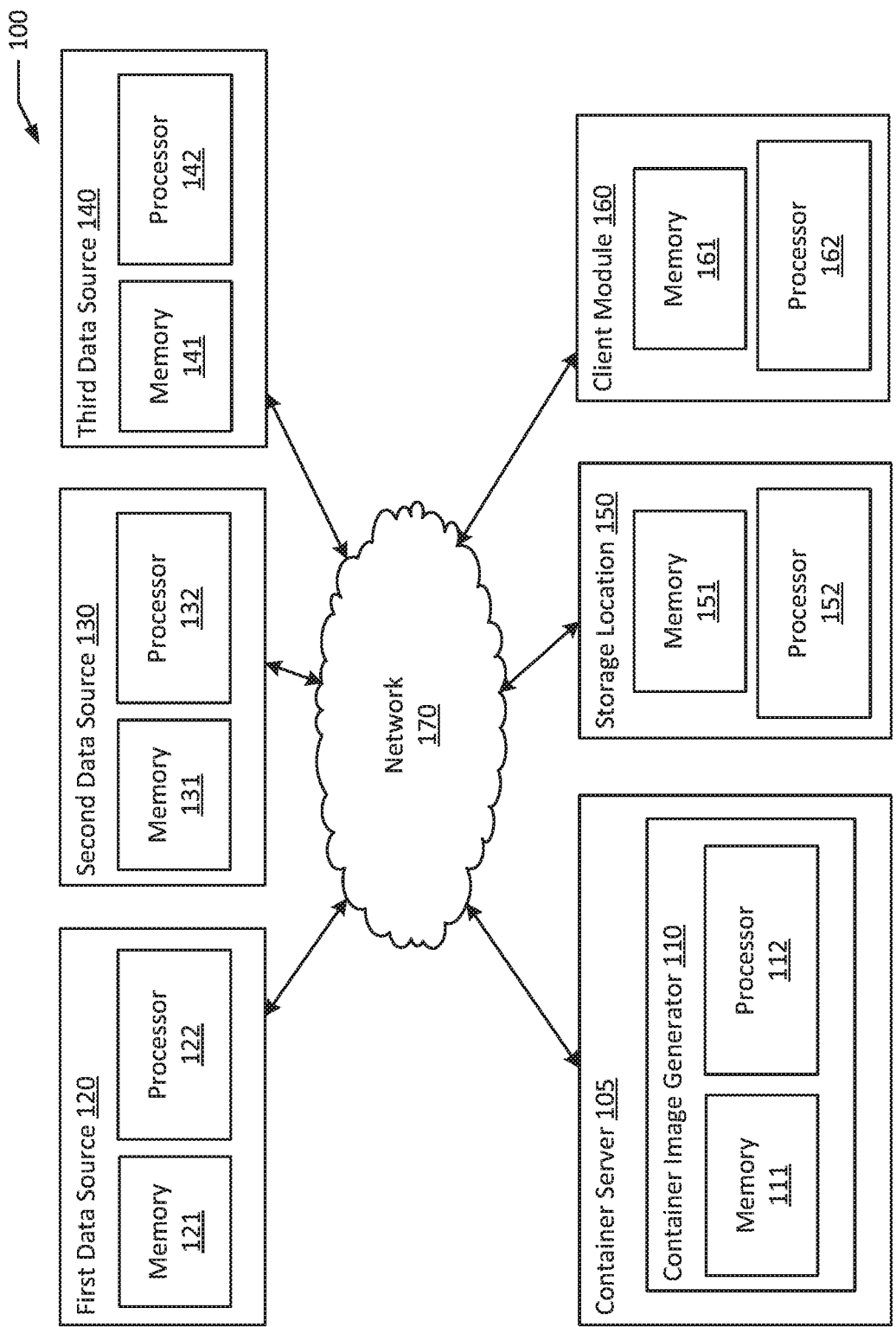
FIG. 1 is a block diagram of an exemplary system for container image layer generation according to an example embodiment of the present disclosure.

Generally, containers are launched from container images, and images are built from many layers where each container image may result from the combination of another container image and a layer. With a few dozen layers in each container image, each of which may be required to be updated periodically, the resulting computational, buildout and storage requirements for creating container images for an application may be a significant source of computing overhead. Thus, the ability to decouple the container image into individual layers is advantageous. This allows, for example, for updating of an individual layer (e.g., to update a database associated with an individual layer) without affecting the container image (e.g., avoiding a complete re-build of the entire container image).

Likewise, these container images are typically distributed to a wide array of machines. For example, container images may consist of multiple layers and be stored at a single location or repository, such as a public image container registry (e.g., Docker® Hub) or a private image container registry (e.g., an individual website). The multiple layers stored at the single location form the container image (e.g., one monolithic piece). Enterprise users who want to keep information private (e.g., passwords, certificates, other sensitive data, etc.) are typically required to store this information outside of the container image. For example, private information may be stored in an external data source (e.g., network-attached storage, encrypted email, etc.). The end user must then be provided with information about how to access the external data source, such that the end user may access the private information when accessing individual layers (e.g., when running an application on an individual layer). As is typically observed, setting up an external data source is often time consuming. Moreover, external data sources are often difficult to consistently reproduce. The entire container image could be encrypted, however, this would allow for a malicious actor to decrypt the entire image if the encryption key is inadvertently discovered.

The systems and methods disclosed herein address the problems discussed above. For example, the system decouples the container image (e.g., the monolithic piece) into layers that may have individual URLs. System commands (e.g., via Docker® Pull, Rocket, Open Container Initiative, etc.) may recognize the URLs and pull the information from each layer's respective URL. For example, this may allow data sources to update sets of information on a layer-by-layer basis. Likewise, the individual URLs may be protected by credentials. For example, the system allows for the decoupling of container image layers to preserve privacy. Implementation of credentials to control access to certain individual layers for security is advantageous. This allows, for example, for individual image layers to preserve privacy. In contrast to an encrypted monolithic container image, implementing credentials to control access to individual layers protects the container image on a layer-by-layer basis.

As an example, a container image generator may receive two sets of information (e.g., an application and a data set). One of these two sets of information (e.g., the application) may not be secure, whereas the other set of information (e.g., the data set) may be secure. For example, the application may be a hospital data management application (e.g., accessible by all employees) that is not secure. By comparison, the data set may include confidential patient medical data (e.g., only accessible by doctors and nurses) that is secure). The container image generator may generate a first container layer, which includes a first URL associated with the hospital data management application. Likewise, the container image generator may generate a second container layer, which includes a second URL associated with the confidential patient medical data. Each of these two layers may be stored at a storage location. For example, the layers may be stored as a container image.

For example, the first URL may be accessible by any employee; thus, any employee can use the first URL to access the hospital data management application. By comparison, the second URL may only be accessible to doctors and nurses; thus, only those with a credential (e.g., doctors and nurses having an appropriate user name and password) can use the second URL to access the confidential patient medical data. In this way, individual sets of information (e.g., the confidential patient medical data) are associated with individual URLs (e.g., the second URL) and may be accessed individually (e.g., via the second URL) with individual security protocols (e.g., the credential) to preserve privacy on a layer-by-layer basis.

FIG. 1 is a block diagram of an exemplary system for container image layer generation according to an example embodiment of the present disclosure. The system 100 includes a container server 105, including a container image generator 110, a first data source 120, a second data source 130, a third data source 140, a storage location 150, and a client module 160.

Each of the container image generator 110, the storage location 150, and the client module 160 may include a memory and a processor. For example, as illustrated in FIG. 1, the container image generator 110 includes memory 111 and processor 112, the storage location 150 includes memory 151 and processor 152, and the client module 160 includes memory 161 and processor 162. The container server 105 communicates with the storage location 150 and the client module 160. The container server 105 likewise communicates with individual data sources.

For example, the container server 105 may communicate with a first data source 120, a second data source 130, and a third data source 140. In an example, each of the first data source 120, the second data source 130, and the third data source 140 may be an operating system, middleware, applications, database, or other source of information. Each of the first data source 120, the second data source 130, and the third data source 140 may include a memory and a processor. For example, the first data source 120 includes memory 121 and processor 122, the second data source 130 includes memory 131 and processor 132, and the third data source 140 includes memory 141 and processor 142.

For example, each of the components noted above (e.g., container server 105, container image generator 110, first data source 120, second data source 130, third data source 140, storage location 150, client module 160, etc.) may be a personal computing device, server, virtual machine, or application executing on a personal computing device, server, one or more physical processors, etc. Likewise, for example, each of the components noted above (e.g., container server 105, container image generator 110, first data source 120, second data source 130, third data source 140, storage location 150, client module 160, etc.) may be coupled to other processors, other memory devices, and other input/output devices (e.g., a network device, a network interface controller (NIC), a network adapter, any other component that connects a computer to a computer network, a peripheral component interconnect (PCI) device, storage devices, sound or video adaptors, photo/video cameras, printer devices, keyboards, displays, etc.).

Each of the components noted above may be connected to a network 170. For example, the network 170 may be a public network (e.g., the Internet), a private network (e.g., a local area network (LAN) or wide area network (WAN)), or a combination thereof. For example, the container server 105 communicates with each of the first data source 120, the second data source 130, the third data source 140, the storage location 150, and the client module 160 over the network 170 as a distributed system 100. Alternatively, for example, each of the components noted above (e.g., container server 105, container image generator 110, first data source 120, second data source 130, third data source 140, storage location 150, client module 160, etc.) may be hard-wire connected to each other.

As used herein, a physical processor or processor refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device or memory refers to a volatile or non-volatile memory device, such as RAM, ROM, EEPROM, or any other device capable of storing data. The system 100 can further include a computer readable medium storing instructions, which, when executed cause the container image generator 110 to operate in the ways described herein.

Figure 2:
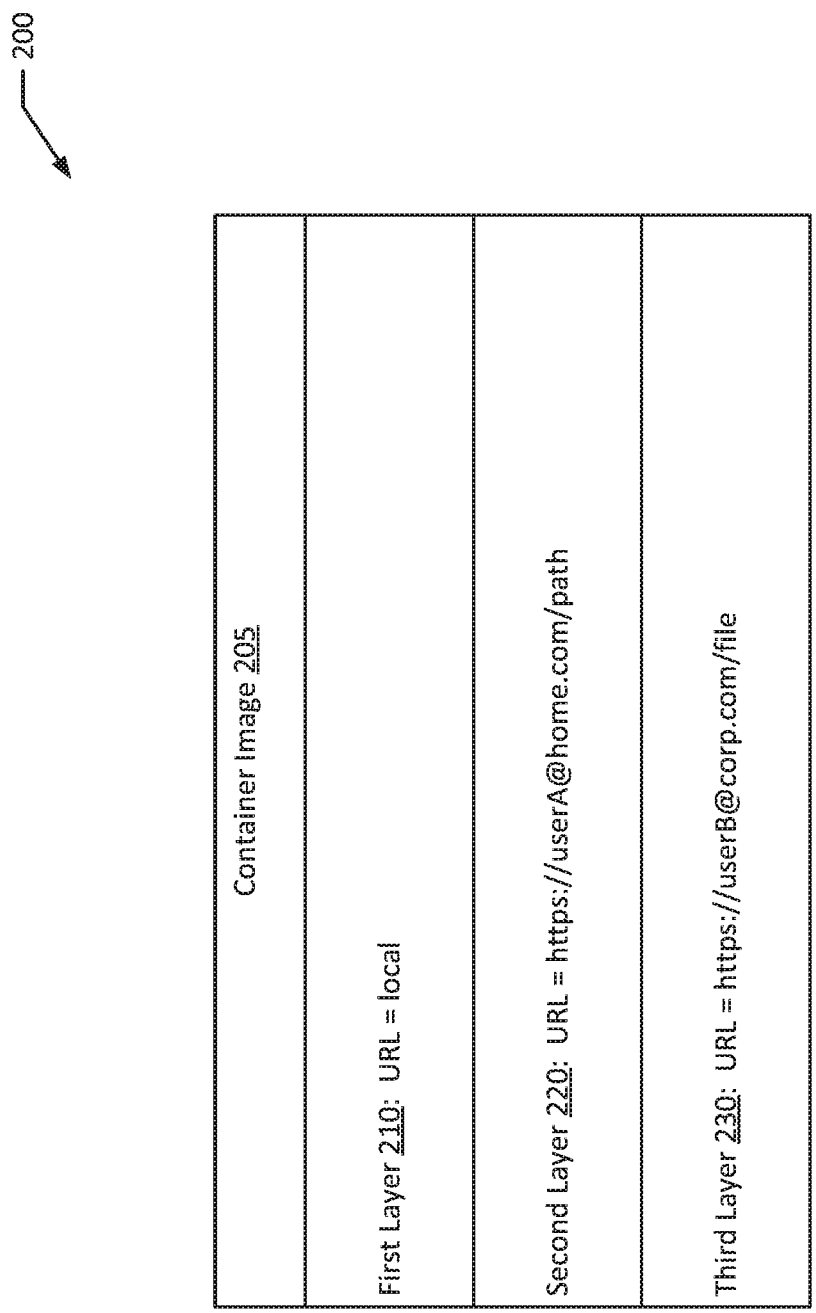
FIG. 2 is a block diagram of an example container image according to an example embodiment of the present disclosure.

FIG. 2 is a block diagram of an example container image according to an example embodiment of the present disclosure. For example, a container image 205 may include multiple image layers (e.g., three layers). In an example, the container image 205 includes a first layer 210, a second layer 220, and a third layer 230.

The first layer 210 may include a first URL. In an example, the first layer 210 specifies a locally provided URL (e.g., "local"). The second layer 220 may include a second URL. In an example, the second layer 220 specifies a remotely provided URL (e.g., "https://userA@home.com/path"). The third layer 230 may include a third URL. In an example, the third layer 230 specifies a remotely provided URL (e.g., "https://userB@corp.com/file").

In an example, each of the second layer 220 and the third layer 230 require validation (e.g., credential validation) to be accessed. For example, when the second layer 220 is pulled, the end user must provide a credential (e.g., user name, password, user name and password, etc.) to successfully retrieve the layer from the second URL. Likewise, for example, when the third layer 230 is pulled, the end user must provide a credential to successfully retrieve the layer from the third URL. In an example, the credentials for the second layer and the third layer may be different, such that a distinct credential may be required to access each remotely provided URL requiring validation.

As an example, a financial institution may implement container image layers and layer-by-layer validation in the following way. In an example, the financial institution's container image 205 may include the first layer 210, which is associated with an operating system (e.g., a Linux operating system). Likewise, in the example, the financial institution's container image 205 may include the second layer 220, which is associated with an application (e.g., a data/spreadsheet application). Likewise, in the example, the financial institution's container image 205 may include the third layer 230, which is associated with a data set (e.g., specific financial information for a customer).

As previously noted, each layer has a respective URL (e.g., the first URL, the second URL, and the third URL). Likewise, each of the individual layers (e.g., first layer 210, second layer 220, and third layer 230) may have different levels of security. For example, the first layer 210 is associated with the operating system; the first layer 210 may not have any required validation. In other words, anyone may access the first layer 210 in order to access the operating system. For example, the first URL is used to retrieve a first set of information (e.g., the Linux operating system) associated with the first layer 210.

Likewise, for example, the second layer 220 is associated with the application; the second layer 220 may require validation (e.g., to restrict the total number of users of the application for software licensing purposes). In other words, to access the second layer 220 (e.g., to access the application), a credential (e.g., a user name) is required. For example, the second URL is used to retrieve a second set of information (e.g., the data/spreadsheet application) associated with the second layer 220; the second URL validates the credential (e.g., the user name) to provide access to the second set of information (e.g., the data/spreadsheet application).

Likewise, for example, the third layer 230 is associated with the data set; the third layer 230 may require validation (e.g., to restrict which users have access to confidential information in the data set). In other words, to access the third layer 230 (e.g., to access the data set), an additional credential (e.g., the user name and a password) is required. For example, the third URL is used to retrieve a third set of information (e.g., the specific financial information for the customer) associated with the third layer; the third URL validates the additional credential (e.g., the user name and the password) to provide access to the third set of information (e.g., the specific financial information for the customer).

By decoupling layers, individual layers may be updated on a layer-by-layer basis. For example, if the financial institution wanted to update the data set, updates to the third layer 230 could be made without requiring any changes to the first layer 210 or the second layer 220.

Likewise, by decoupling layers, individual layers may be securely protected on a layer-by-layer basis. As explained above, some layers (e.g., first layer 210) may have no security. Likewise, as explained above, some layers (e.g., second layer 220 and third layer 230) may have varying degrees of security (e.g., a user name credential vs. a user name and password credential). This allows for access to individual layers to be controlled on a layer-by-layer basis. For example, who may access layers, which layers may be accessed, and how long layers may be accessed are variables that may be controlled. Likewise, for example, if there is any malicious access (e.g., an unauthorized attempt to access the data set), the credential may be changed to a new credential, thus cutting off all access attempts except those with the new credential.

While the examples above implement three-layer container images, it should be appreciated that many more image layers may be implemented by a container image. For example, typical container images may include five to thirty individual image layers. Container images may include, in some examples, hundreds of individual image layers.

Figure 3:
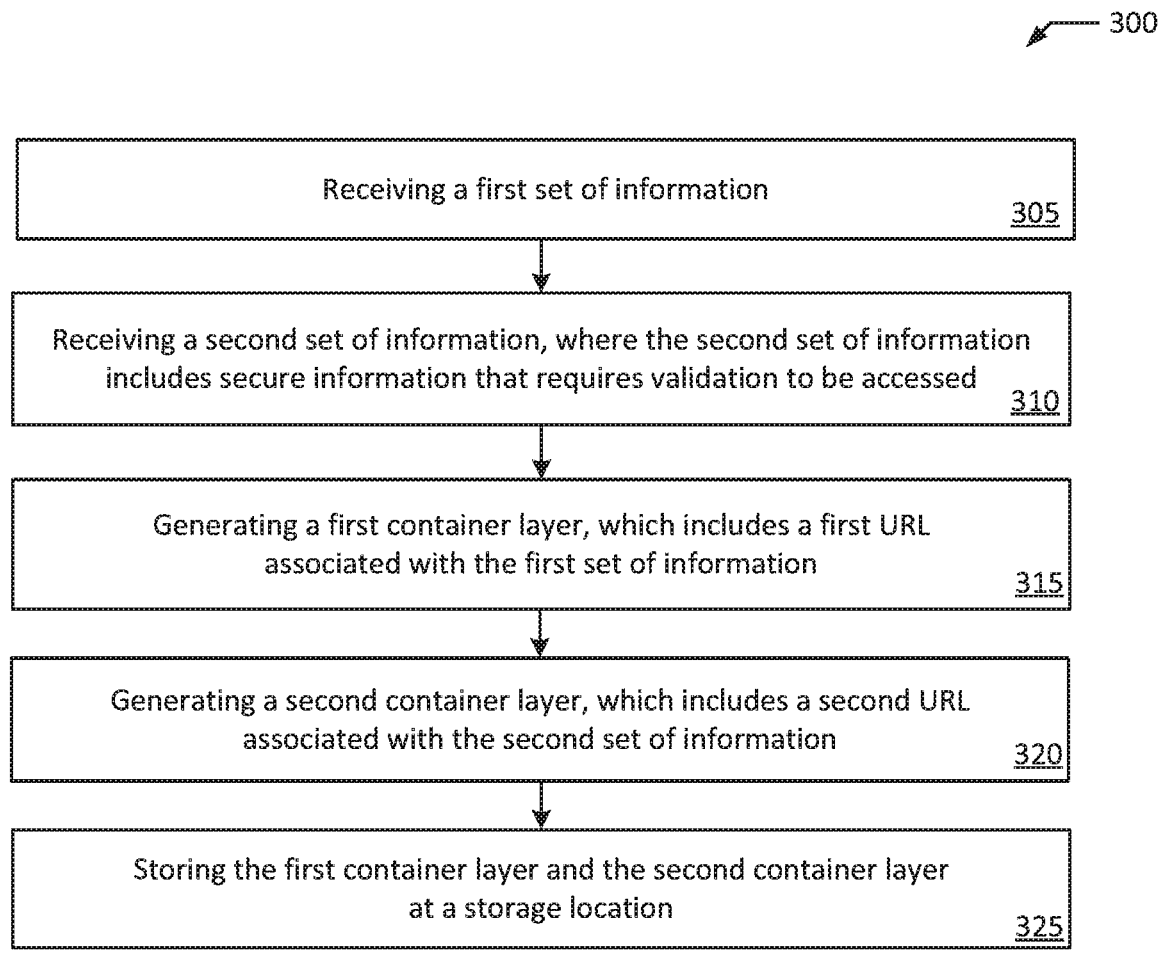
FIG. 3 is a flowchart illustrating an example method of container image layer generation according to an example embodiment of the present disclosure.

FIG. 3 is a flowchart illustrating an example method of container image layer generation according to an example embodiment of the present disclosure. Although the example method 300 is described with reference to the flowchart illustrated in FIG. 3, it will be appreciated that many other methods of performing the acts associated with the method may be used. For example, the order of some of the blocks may be changed, certain blocks may be combined with other blocks, and some of the blocks described are optional. The method may be performed by processing logic that may comprise hardware (e.g., circuitry, dedicated logic, etc.), software, or a combination of both.

The example method 300 begins with receiving a first set of information (block 305). For example, the container image generator 110 receives the first set of information (e.g., an operating system) from the first data source 120. The example method 300 includes receiving a second set of information, where the second set of information includes secure information that requires validation to be accessed (block 310). For example, the container image generator 110 receives the second set of information (e.g., an application) from the second data source 130. In an example, the second set of information may be a classified application used by a government agency for investigations. In other examples, the second set of information may be another type of application, such as a hospital data management application, an insurance claims application, a financial data/spreadsheet application, etc.

The example method 300 includes generating a first container layer, which includes a first URL associated with the first set of information (block 315). For example, the container image generator 110 generates first layer 210, which includes the first URL (e.g., "local") associated with the first set of information (e.g., the operating system). The example method 300 includes generating a second container layer, which includes a second URL associated with the second set of information (block 320). For example, the container image generator 110 generates second layer 220, which includes the second URL (e.g., "https://userA@home.com/path") associated with the second set of information (e.g., the application).

The example method 300 includes storing the first container layer and the second container layer at a storage location (block 325). For example, the container image generator 110 stores first layer 210 and second layer 220 at storage location 150. In an example, first layer 210 and second layer 220 are included as a container image that is stored at storage location 150.

Figure 4A:
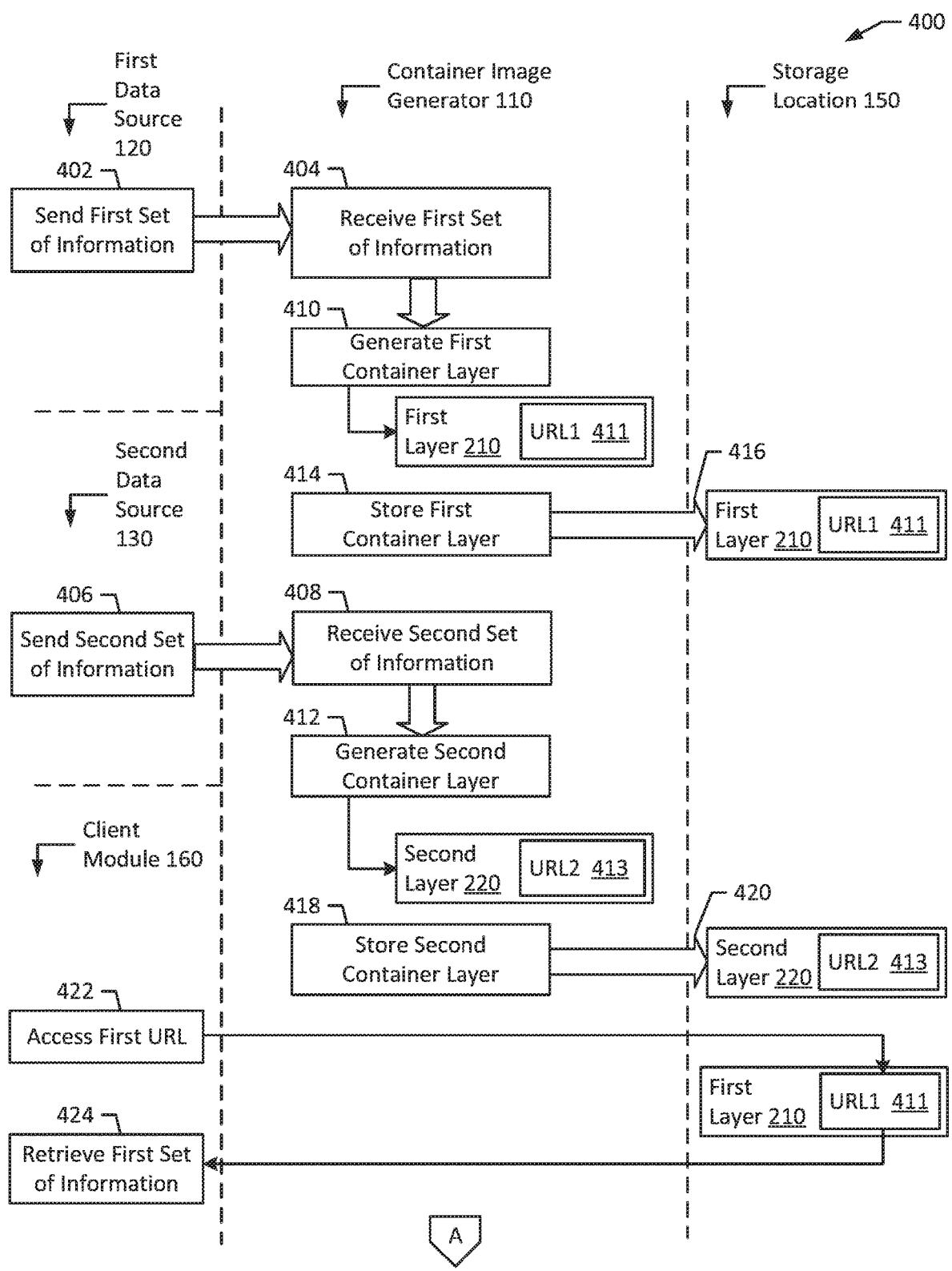
FIGS. 4A-4B are flow diagrams illustrating an example method of container image layer generation according to an example embodiment of the present disclosure.
Figure 4B:
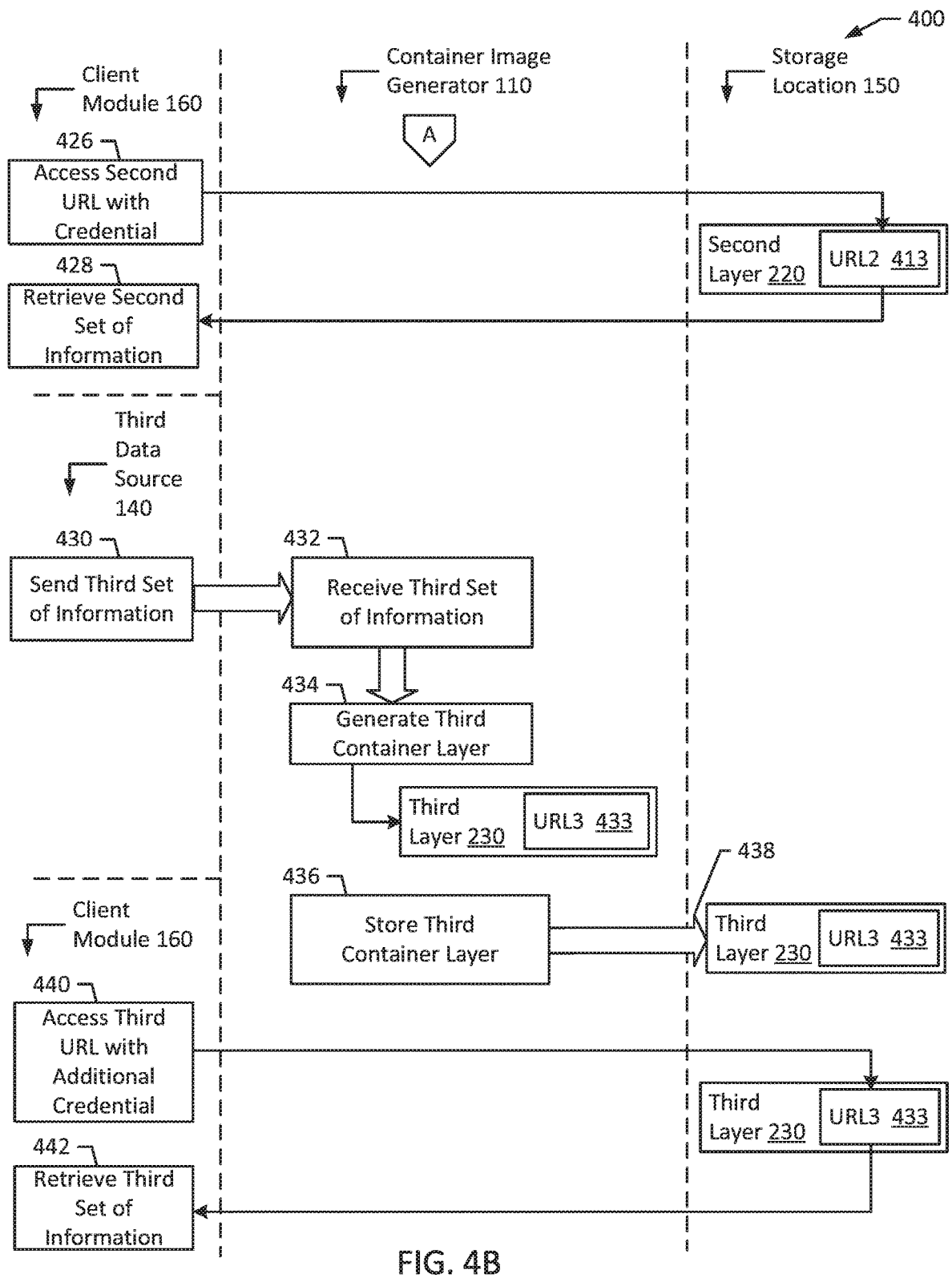

FIGS. 4A-4B are flow diagrams illustrating an example method of container image layer generation according to an example embodiment of the present disclosure. Although the example method 400 is described with reference to the flow diagram illustrated in FIGS. 4A-4B, it will be appreciated that many other methods of performing the acts associated with the method may be used. For example, the order of some of the blocks may be changed, certain blocks may be combined with other blocks, and some of the blocks described are optional. The method may be performed by processing logic that may comprise hardware (e.g., circuitry, dedicated logic, etc.), software, or a combination of both.

The example method 400 begins with the first data source 120 sending a first set of information to the container image generator 110 (block 402). In an example, the first set of information is an operating system. The container image generator 110 receives the first set of information (block 404) Likewise, the second data source 130 sends a second set of information to the container image generator 110 (block 406). In an example, the second set of information may include secure information that requires validation to be accessed. For example the second set of information is an application, program, data set, etc. The container image generator 110 receives the second set of information (block 408). In an example, the first data source 120 and the second data source 130 are distinct sources (e.g., not connected to one another); in a different example, the first data source 120 and the second data source 130 are related sources (e.g., from a connected or mutual location, node, or repository).

The container image generator 110 generates a first container layer 210 (block 410). For example, the first container layer 210 includes a first URL 411. In an example, first URL 411 specifies a locally provided URL (e.g., "local"). Likewise, the container image generator 110 generates a second container layer 220 (block 412). For example, the second container layer 220 includes a second URL 413. In an example, second URL 413 specifies a remote URL requiring validation (e.g., "https://userA@home.com/path").

The container image generator 110 stores the first container layer 210 at the storage location 150 (blocks 414 and 416). For example, the first URL 411 is stored at storage location 150. The container image generator 110 stores the second container layer 220 at the storage location 150 (blocks 418 and 420). For example, the second URL 413 is stored at storage location 150. In an example, the first container layer 210 and the second container layer 220 are included in a container image (e.g., container image 205), which may be stored at storage location 150. In an example, storage location 150 is a location that is external to client module 160.

The client module 160 accesses first URL 411 at storage location 150 (block 422). In an example, the storage location 150 is a public container image registry (e.g., Docker® Hub). In a different example, the storage location 150 is a private container image registry (e.g., an individual website). By accessing first URL 411, the client module 160 may retrieve the first set of information (block 424).

Continuing on with example method 400, the client module 160 accesses second URL 413 with a credential, at storage location 150 (block 426). In an example, the credential is initially stored at a location separate from storage location 150 (e.g., the client module 160 may store the credential). For example, the second URL 413 validates the credential, which is required to retrieve the second set of information. In an example, the credential includes a user name. In another example, the credential includes a user name and a password. By accessing second URL 413, with the credential, the client module 160 may retrieve the second set of information (block 428).

As previously noted, in an example, the second set of information may be a classified application used by a government agency for investigations, a hospital data management application, an insurance claims application, a financial data/spreadsheet application, etc. For example, if the second set of information is the classified application used by a government agency for investigations, the second set of information may provide access to the classified application. To access this classified application (e.g., the second set of information retrieved via the second layer), the credential is required. For example, a number of government agencies (e.g., CIA, FBI, NSA, etc.) may have the credential and be able to retrieve the second set of information via the second layer.

Likewise, for example, if the second set of information is the hospital data management application, the second set of information may provide access to the hospital data management application. To access this hospital data management application (e.g., the second set of information retrieved via the second layer), the credential is required. For example, a number of different parties (e.g., family members, doctors, nurses, hospital staff, etc.) may have the credential and be able to retrieve the second set of information via the second layer.

In an example, the credential is changed to a new credential. For example, the credential is changed, by the second data source 130, to the new credential. Once the credential is changed to the new credential, the second URL 413 is only accessible with the new credential. For example, the credential is disabled, and changed to the new credential, in response to a malicious attack, data breach, etc. To access the second URL 413 at storage location 150, the second URL 413 validates the new credential, which is required to retrieve the second set of information. For example, once the credential has been changed to the new credential, the second URL 413 will only validate the new credential to retrieve the second set of information; the original credential may no longer be validated by the second URL 413 to retrieve the second set of information.

The example method 400 further includes the third data source 140 sending a third set of information to the container image generator 110 (block 430). In an example, the third set of information may include secure information that requires validation to be accessed. For example, the third set of information is an application, program, data set, etc. The container image generator 110 receives the third set of information (block 432). The container image generator 110 generates a third container layer 230 (block 434). For example, the third container layer 230 includes a third URL 433. In an example, third URL 433 specifies a remote URL requiring validation (e.g., "https://userB@corp.com/file").

The container image generator 110 stores the third container layer 230 at the storage location 150 (blocks 436 and 438). For example, the third URL 433 is stored at storage location 150 with the first URL 411 and the second URL 413. In an example, the third container layer 230 is included in the container image with the first container layer 210 and the second container layer 220 (e.g., container image 205), which may be stored at storage location 150.

The client module 160 accesses third URL 433 with an additional credential at storage location 150 (block 440). In an example, the additional credential is initially stored at a location separate from storage location 150 (e.g., the client module 160 may store the additional credential). For example, the third URL 433 validates the additional credential, which is required to retrieve the third set of information. In an example, the additional credential includes a user name and/or a password. In another example, the additional credential includes a token. By accessing third URL 433 with the additional credential, the client module 160 may retrieve the third set of information (block 442).

As an example, the third set of information may be a data set. For example, as previously noted, the second set of information may be a classified application used by a government agency for investigations, a hospital data management application, etc. Likewise, for example, the third set of information may be a data set used by each of these respective applications.

For example, if the second set of information is the classified application used by a government agency for investigations, the third set of information may be a criminal database used by the classified application. The third set of information may provide access to the criminal database (e.g., providing the name, birthdate, height, weight, etc. of a suspect). To access this criminal database (e.g., the third set of information retrieved via the third layer), an additional credential is required. For example, a number of government agencies (e.g., CIA, FBI, NSA, IRS, etc.) may have a credential and be able to retrieve the second set of information via the second layer (e.g., access the classified application). By comparison, only a select few government agencies (e.g., CIA, NSA, FBI) may have an additional credential and be able to retrieve the third set of information via the third layer (e.g., access to the criminal database). For example, access may be restricted for constitutional/criminal evidentiary purposes. In a related example, each select government agency (e.g., CIA, NSA, FBI) may have a different credential to access different layers. Likewise, in an example, different credentials may result in different degrees of information retrieved by a given layer. For example, a field agent may use an additional credential to access the criminal database (e.g., a third layer) and view all the active suspects and cases that the particular field agent is working on. In this way, different credentials may provide access to different layers with the same type of data (e.g., different field agents accessing different portions of the criminal database with their respective credentials). By comparison, the director of an investigations department may use a master credential to access any data within the criminal database (e.g., a third layer) and view all active suspects and cases that the entire department is working on.

Likewise, for example, if the second set of information is the hospital data management application, the third set of information may be a patient database used by the hospital data management application. The third set of information may provide access to the patient database (e.g., providing the name, birthdate, room number, medical history, etc. of a patient). To access this patient database (e.g., the third set of information retrieved via the third layer), an additional credential is required. For example, a number of different parties (e.g., doctors, nurses, hospital staff, auxiliary personnel, etc.) may have a credential and be able to retrieve the second set of information via the second layer (e.g., access the hospital data management application). By comparison, only a select few parties (e.g., doctors, nurses) may have an additional credential and be able to retrieve the third set of information via the third layer (e.g., access to the patient database). For example, access may be restricted for compliance with healthcare privacy laws. Likewise, in an example, different credentials may result in different degrees of information retrieved by a given layer. For example, a nurse may use an additional credential to access the patient database (e.g., a third layer) and view all the patients in the hospital wing where the nurse is working. In this way, different credentials may provide access to different layers with the same type of data (e.g., different nurses accessing different portions of the patient database with their respective credentials). By comparison, the doctor may use a master credential to access any data within the patient database (e.g., a third layer) and view all the patients in the entire hospital.

In each of the examples above, at least some of the information (e.g., the second set of information and the third set of information) may be private. Thus, by decoupling the layers, privacy is preserved on a layer-by-layer basis. For example, access to individual layers is provided by individual URLs, and validated with individual credentials. This ensures that only particular groups or users (e.g., only the CIA, NSA, and FBI) can access particular layers (e.g., the criminal database). By comparison, if a single container including private information without decoupled layers (e.g., one monolithic piece) is implemented, giving a group or user access to the container image may result in granting the group or user access to all the layers of the monolithic piece.

Figure 5:
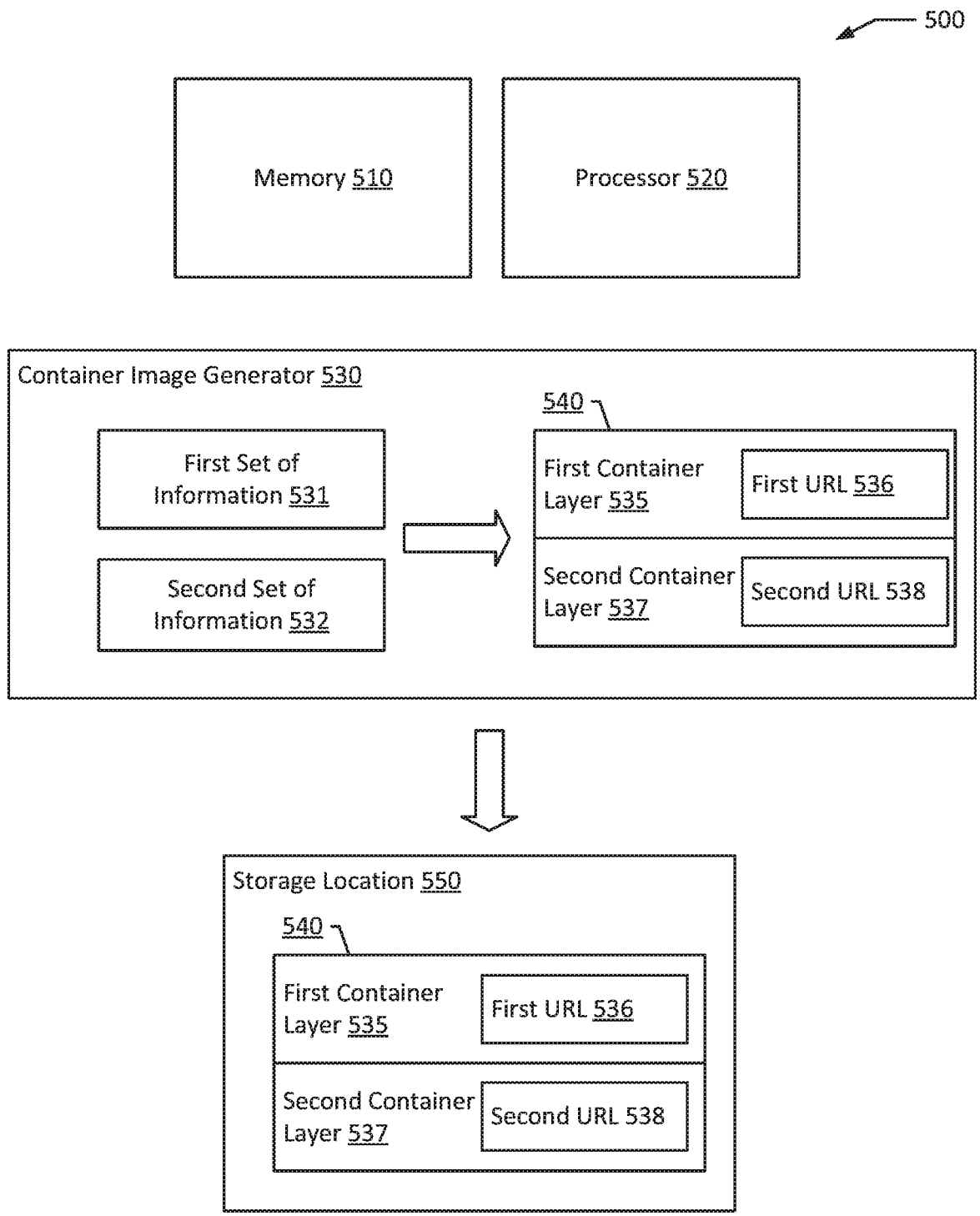
FIG. 5 is a block diagram of an exemplary system for container image layer generation according to an example embodiment of the present disclosure.

FIG. 5 is a block diagram of an exemplary system for container image layer generation according to an example embodiment of the present disclosure. The system 500 includes a memory 510 and a processor 520. The system 500 further includes a container image generator 530 and a storage location 550.

The container image generator 530 receives a first set of information 531. The container image generator 530 receives a second set of information 532. In an example, the second set of information 532 includes secure information that requires validation to be accessed.

The container image generator 530 generates a first container layer 535. The first container layer 535 includes a first URL 536 associated with the first set of information 531. The container image generator 530 generates a second container layer 537. The second container layer 537 includes a second URL 538 associated with the second set of information 532. In an example, the first container layer 535 and the second container layer 537 are a container image 540.

The container image generator 530 stores the first container layer 535 and the second container layer 537 at a storage location 550. In an example, the container image generator 530 stores the container image 540, including the first container layer 535 and the second container layer 537, at the storage location 550.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without dimin- The invention is claimed as follows:

1. A method comprising:
receiving a first set of information from a first data source;
receiving a second set of information from a second data source, the second data source being independent from the first data source, wherein the second set of information includes secure information that requires validation to be accessed;
generating a plurality of container layers, by a container image generator, the plurality of container layers including a first container layer, the first container layer including a first URL associated with the first set of information
the plurality of container layers further including a second container layer, the second container layer including a second URL associated with the second set of information; and
storing the first container layer and the second container layer at a storage location,
wherein the plurality of container layers including the first container layer and the second container layer form a container image as one monolithic piece in a container based virtualization system, such that the container image is exclusively comprised of the plurality of container layers, and
wherein each of the first container layer and the second container layer are independently accessible.

2. The method of claim 1, further comprising:
accessing the first URL; and
retrieving the first set of information.

3. The method of claim 1, further comprising:
accessing, with a credential, the second URL, wherein the second URL validates the credential, which is required to retrieve the second set of information; and
retrieving the second set of information.

4. The method of claim 3, wherein the credential includes a user name.

5. The method of claim 4, wherein the credential further includes a password.

6. The method of claim 3, further comprising:
receiving a third set of information from a third data source, wherein the third set of information includes secure information that requires validation to be accessed;
generating, by the container image generator, a third container layer, the third container layer including a third URL associated with the third set of information, such that the plurality of container layers further includes the third container layer; and
storing the third container layer at the storage location, wherein the first container layer, the second container layer, and the third container layer are stored at the storage location.

7. The method of claim 6, further comprising:
accessing, with an additional credential, the third URL, wherein the third URL validates the additional credential, which is required to retrieve the third set of information; and
retrieving the third set of information.

8. The method of claim 7, wherein each of the credential and the additional credential are stored at locations separate from the storage location.

9. The method of claim 3, further comprising changing the credential to a new credential, such that the second URL is only accessible with the new credential, wherein the second URL validates the new credential, which is required to retrieve the second set of information.

10. The method of claim 1, wherein the storage location is a public container image registry.

11. The method of claim 1, wherein the storage location is a private container image registry.

12. The method of claim 1, wherein the first URL specifies a locally provided URL.

13. The method of claim 1, wherein the second URL specifies a remote URL requiring validation.

14. A system comprising:
a memory;
one or more processors, in communication with the memory;
a container image generator, wherein the container image generator:
receives a first set of information from a first data source;
receives a second set of information from a second data source, the second data source being independent from the first data source, wherein the second set of information includes secure information that requires validation to be accessed;
generates a plurality of container layers, the plurality of container layers including a first container layer, the first container layer including a first URL associated with the first set of information,
the plurality of container layers further including a second container layer, the second container layer including a second URL associated with the second set of information; and
stores the first container layer and the second container layer at a storage location,
wherein the plurality of container layers including the first container layer and the second container layer form a container image as one monolithic piece in a container based virtualization system, such that the container image is exclusively comprised of the plurality of container layers, and
wherein each of the first container layer and the second container layer are independently accessible.

15. The system of claim 14, further comprising a client module, wherein the client module:
accesses, with a credential, the second URL, wherein the second URL validates the credential, which is required to retrieve the second set of information, and
retrieves the second set of information.

16. The system of claim 15, wherein the container image generator additionally:
receives a third set of information from a third data source, wherein the third set of information includes secure information that requires validation to be accessed;
generates a third container layer, the third container layer including a third URL associated with the third set of information, such that the plurality of container layers further includes the third container layer; and
stores the third container layer at the storage location, wherein the first container layer, the second container layer, and the third container layer are stored at the storage location, and
wherein the client module:
accesses, with an additional credential, the third URL, wherein the third URL validates the additional credential, which is required to retrieve the third set of information, and
retrieves the third set of information.

17. The system of claim 15, wherein the credential is changed to a new credential, such that the second URL is only accessible with the new credential, wherein the second URL validates the new credential, which is required to retrieve the second set of information.

18. A computer-readable non-transitory storage medium comprising executable instructions that, when executed, are configured to cause a container image generator to:
- receive a first set of information from a first data source;
- receive a second set of information from a second data source, the second data source being independent from the first data source, wherein the second set of information includes secure information that requires validation to be accessed;
- generate a plurality of container layers, the plurality of container layers including a first container layer, the first container layer including a first URL associated with the first set of information,
- the plurality of container layers further including a second container layer, the second container layer including a second URL associated with the second set of information; and
- store the first container layer and the second container layer at a storage location,
- wherein the plurality of container layers including the first container layer and the second container layer form a container image as one monolithic piece in a container based virtualization system, such that the container image is exclusively comprised of the plurality of container layers, and
- wherein each of the first container layer and the second container layer are independently accessible.

* * * * *